United States Patent
Nasu et al.

(10) Patent No.: US 8,332,363 B2
(45) Date of Patent: Dec. 11, 2012

(54) STORAGE SYSTEM AND DATA MANAGEMENT METHOD OF THE SAME

(75) Inventors: Hiroshi Nasu, Yokohama (JP); Yuri Hiraiwa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 671 days.

(21) Appl. No.: 12/526,776

(22) PCT Filed: Apr. 24, 2009

(86) PCT No.: PCT/JP2009/001882
§ 371 (c)(1),
(2), (4) Date: Aug. 11, 2009

(87) PCT Pub. No.: WO2010/122606
PCT Pub. Date: Oct. 28, 2010

(65) Prior Publication Data
US 2011/0191302 A1 Aug. 4, 2011

(51) Int. Cl.
*G06F 7/00* (2006.01)
(52) U.S. Cl. .......... 707/662; 707/694
(58) Field of Classification Search ............ 711/161, 711/216; 710/74; 707/661–666, 692, 694, 707/698, 747, 812; 713/1
See application file for complete search history.

(56) References Cited

U.S. PATENT DOCUMENTS

| | | | |
|---|---|---|---|
| 7,249,251 B2 * | 7/2007 | Todd et al. | 713/1 |
| 7,376,681 B1 | 5/2008 | Todd et al. | |
| 7,590,807 B2 * | 9/2009 | McGovern et al. | 711/159 |
| 7,809,868 B1 * | 10/2010 | Mu | 710/74 |
| 2004/0133577 A1 * | 7/2004 | Miloushev et al. | 707/10 |
| 2005/0160481 A1 | 7/2005 | Todd et al. | |
| 2007/0118687 A1 * | 5/2007 | McGovern et al. | 711/112 |
| 2007/0260643 A1 | 11/2007 | Borden et al. | |
| 2007/0260830 A1 * | 11/2007 | Faibish et al. | 711/162 |
| 2007/0260842 A1 * | 11/2007 | Faibish et al. | 711/170 |
| 2007/0283410 A1 * | 12/2007 | Hsu | 726/1 |
| 2007/0294274 A1 * | 12/2007 | Kano | 707/101 |
| 2008/0005468 A1 * | 1/2008 | Faibish et al. | 711/114 |
| 2009/0292734 A1 * | 11/2009 | Miloushev et al. | 707/104.1 |

FOREIGN PATENT DOCUMENTS
WO WO 2005/043323 A2 5/2005

OTHER PUBLICATIONS

PCT International Search Report on International Application No. PCT/JP2009/001882 dated Dec. 15, 2009; 4 pages.

* cited by examiner

*Primary Examiner* — James Trujillo
*Assistant Examiner* — Linh Black
(74) *Attorney, Agent, or Firm* — Foley & Lardner LLP

(57) ABSTRACT

A storage system 1 including: a plurality of data storage systems 3000 each including a storage apparatus 5000 providing a data storage area to an external apparatus 1000, and an information processor 4000 controlling data input and output between the external apparatus and the storage apparatus, the storage system comprising; a data attribute information retention part 4420 holding data delete allow/disallow information 4423 and data attribute information 4421 and 4424; a management information retention part 2420 that is a list holding at least one of data attribute information 2421, and data storage location information 2422 of each piece of data; and a data delete control part 4440 receiving a data delete command and controlling a process of deleting the data stored in the storage apparatus based on the command. Upon receipt of the data delete command, the data delete control part sets to the file determined to be identical from being deleted when determining that the file identical to the delete target exists in the storage system.

15 Claims, 16 Drawing Sheets

[Fig. 1]
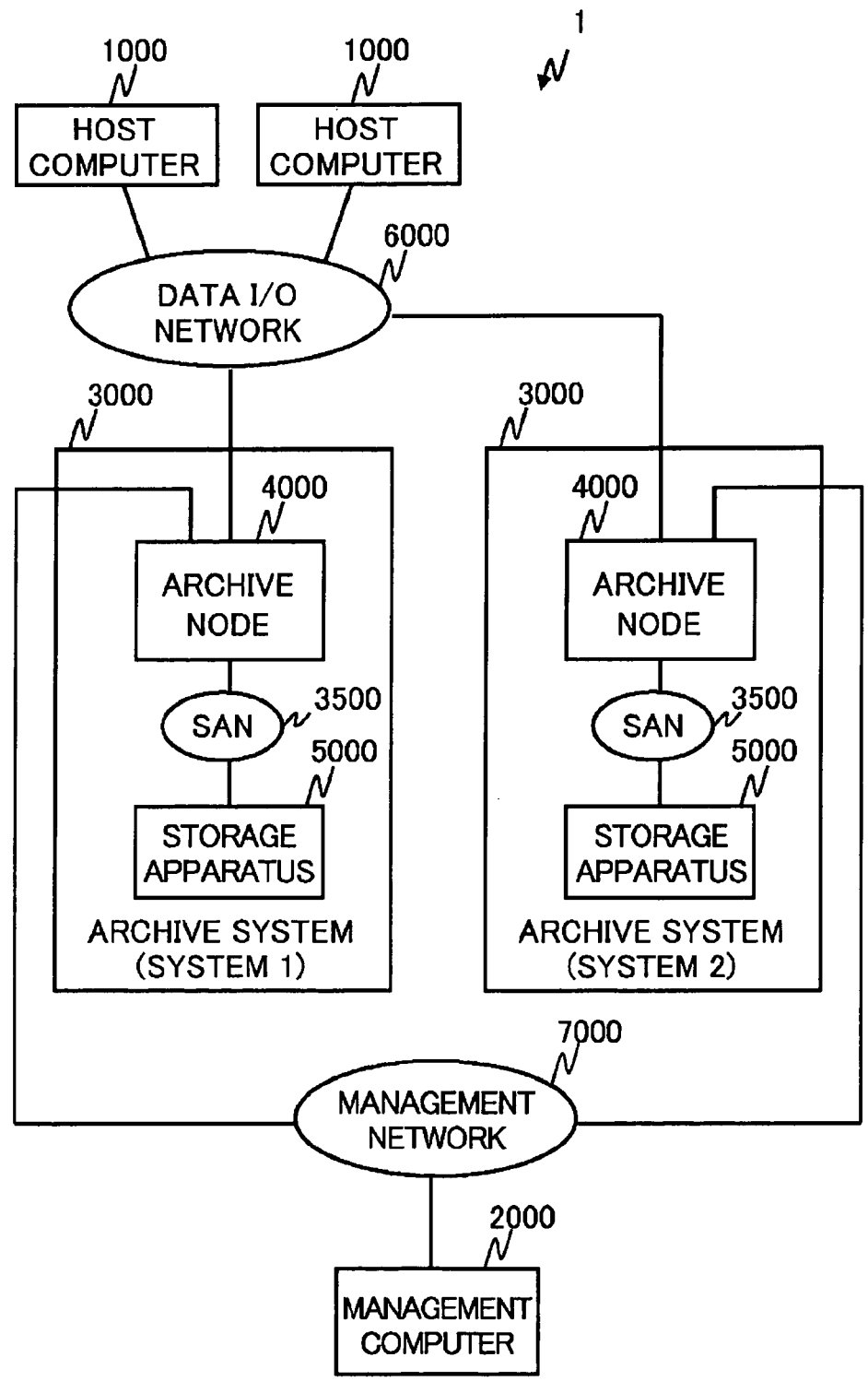

[Fig. 2]
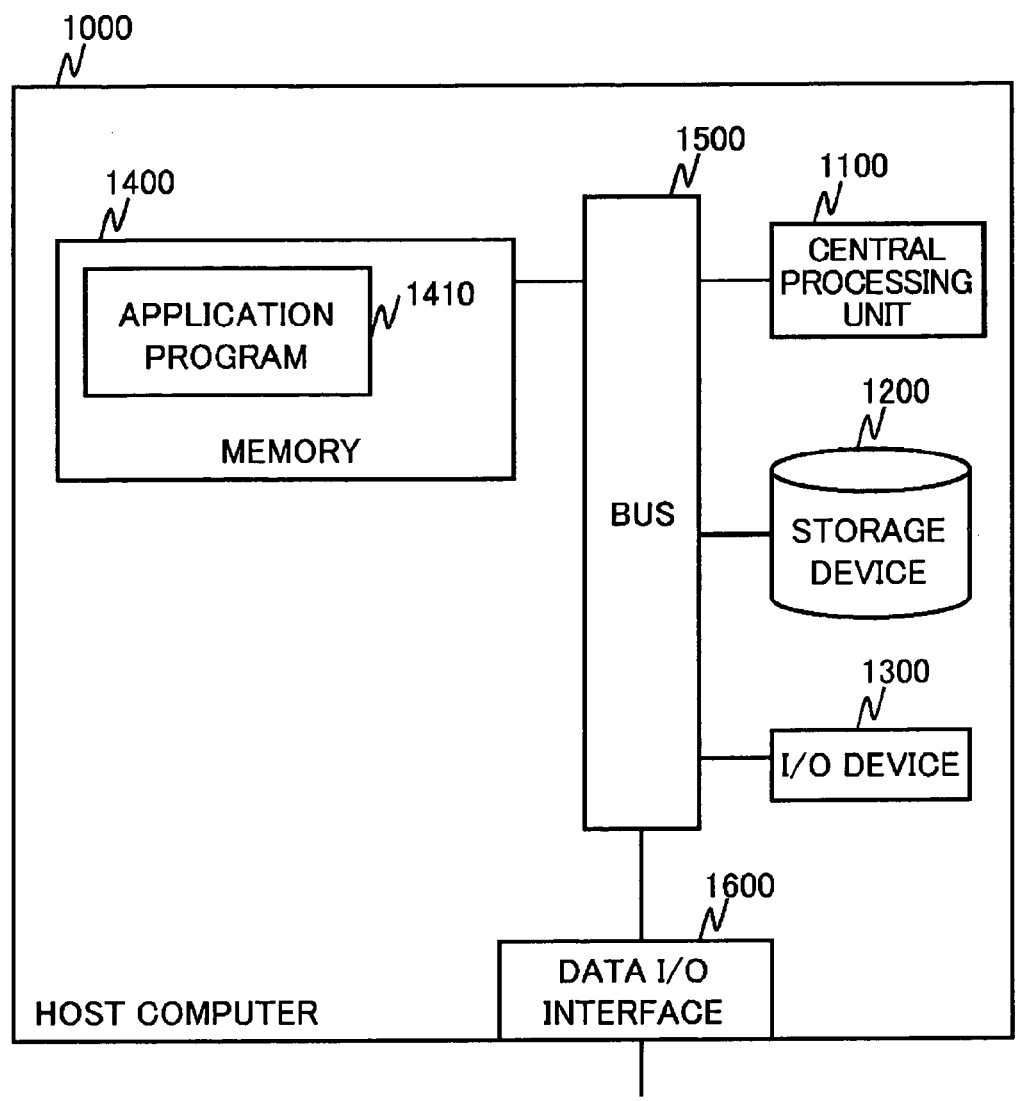

[Fig. 3]
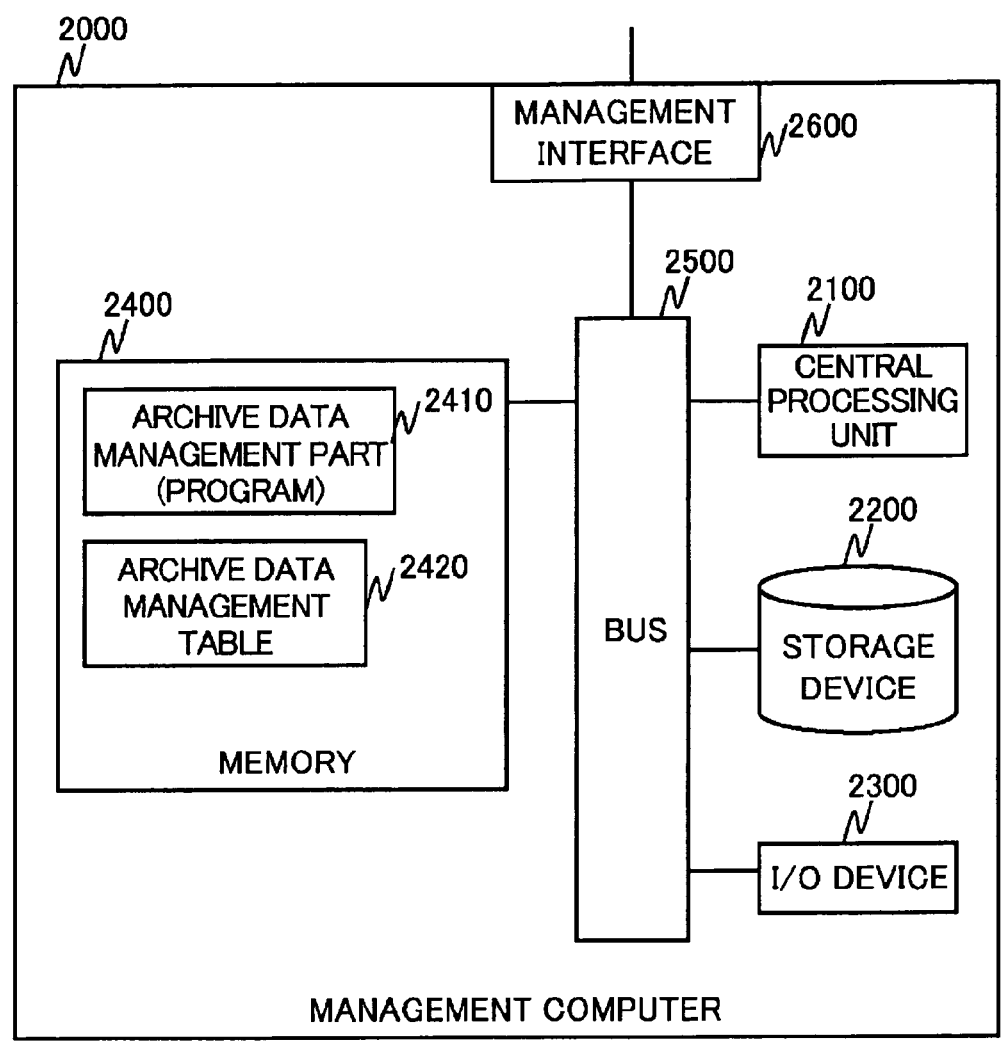

[Fig. 4]
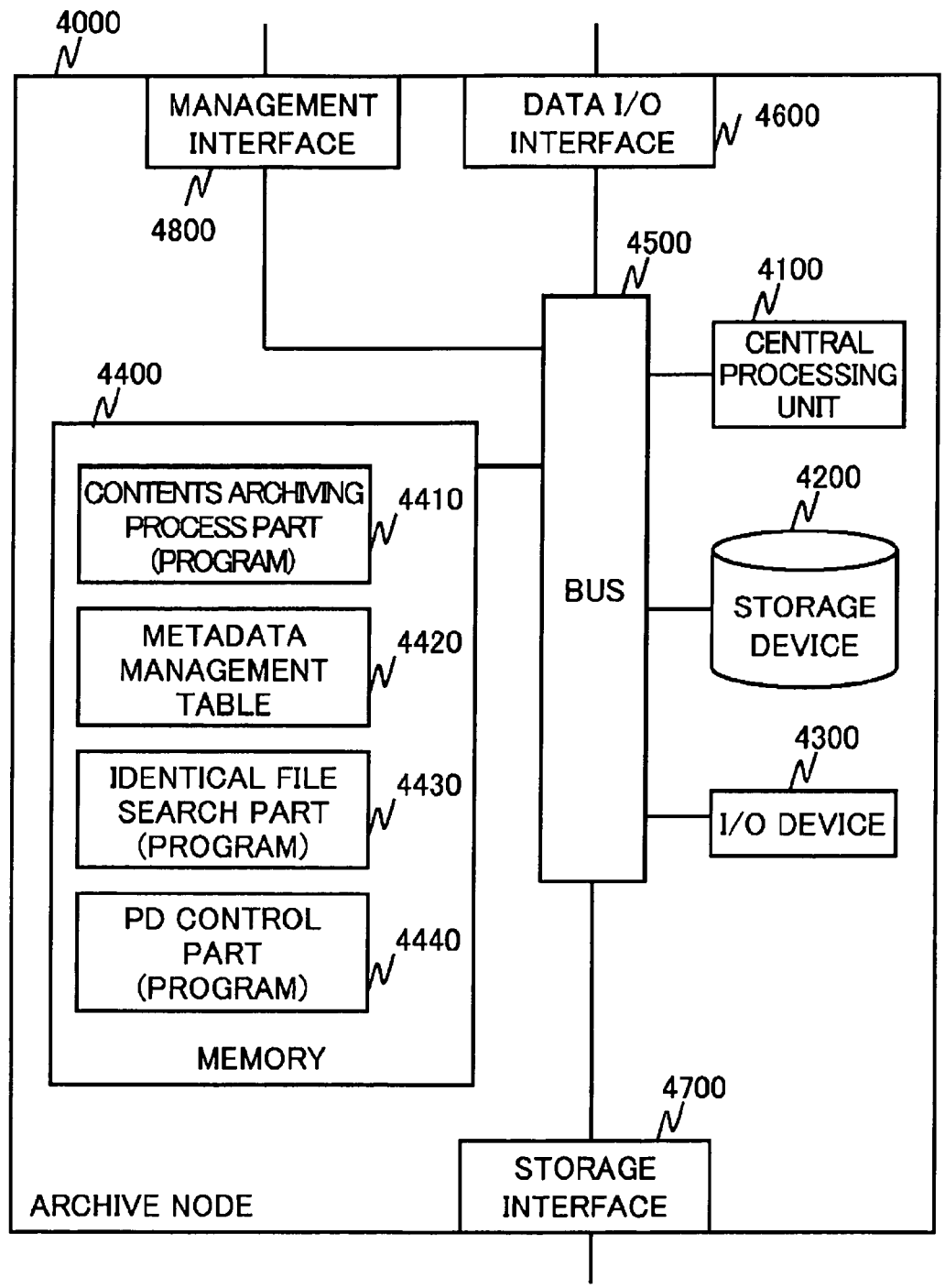

[Fig. 5]
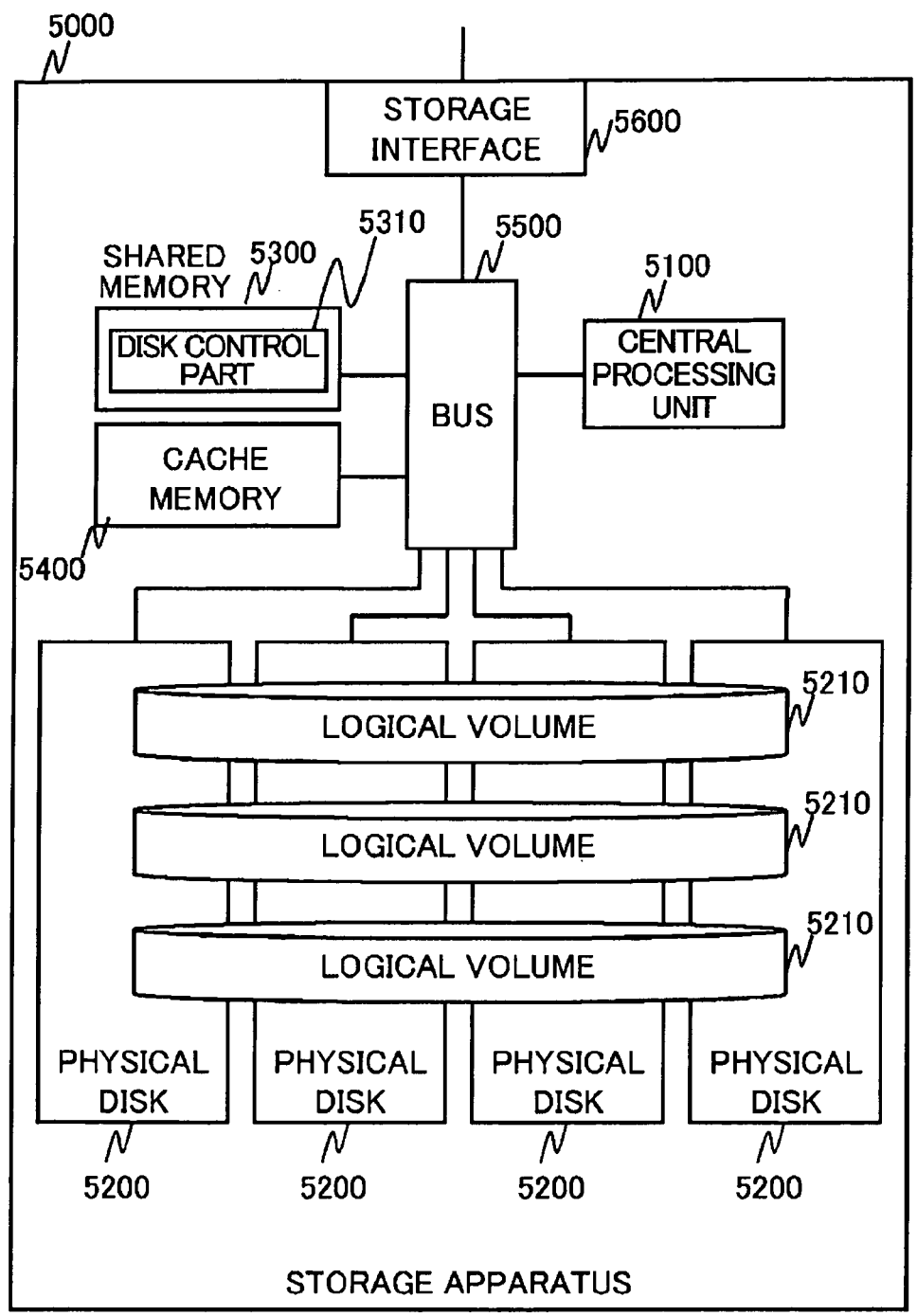

[Fig. 6]

METADATA MANAGEMENT TABLE 4420
(SYSTEM 1)

| FILE NAME | DIRECTORY PATH NAME | STORAGE EXPIRY DATE | HASH VALUE |
|---|---|---|---|
| A.jpg | /data/dir1/ | 2015.12.31 | E74D5F14B3DBDC70 |
| B.doc | /data/dir1/ | 2015.12.31 | 2DA09B3E330C48D6 |
| C.ppt | /data/dir2/ | 2010.03.31 | B038047E027E8577 |
| D.xls | /data/dir3/ | 2020.09.30 | A16C35D8F01CFE3C |

[Fig. 7]

METADATA MANAGEMENT TABLE 4420
(SYSTEM 2)

| FILE NAME | DIRECTORY PATH NAME | STORAGE EXPIRY DATE | HASH VALUE |
|---|---|---|---|
| A.jpg | /data/archive/dir1/ | 2015.12.31 | E74D5F14B3DBDC70 |
| B.doc | /data/archive/dir1/ | 2015.12.31 | 2DA09B3E330C48D6 |

ARCHIVE DATA MANAGEMENT TABLE 2420

| FILE NAME | ARCHIVE SYSTEM NAME | DIRECTORY PATH NAME | LOCK |
|---|---|---|---|
| A.jpg | SYSTEM 1 | /data/dir1/ | ON |
|  | SYSTEM 2 | /data/archive/dir1/ | ON |
| B.doc | SYSTEM 1 | /data/dir1/ | OFF |
|  | SYSTEM 2 | /data/archive/dir1/ | OFF |
| C.ppt | SYSTEM 1 | /data/dir2/ | OFF |
| D.xls | SYSTEM 1 | /data/dir3/ | OFF |

[Fig. 9]
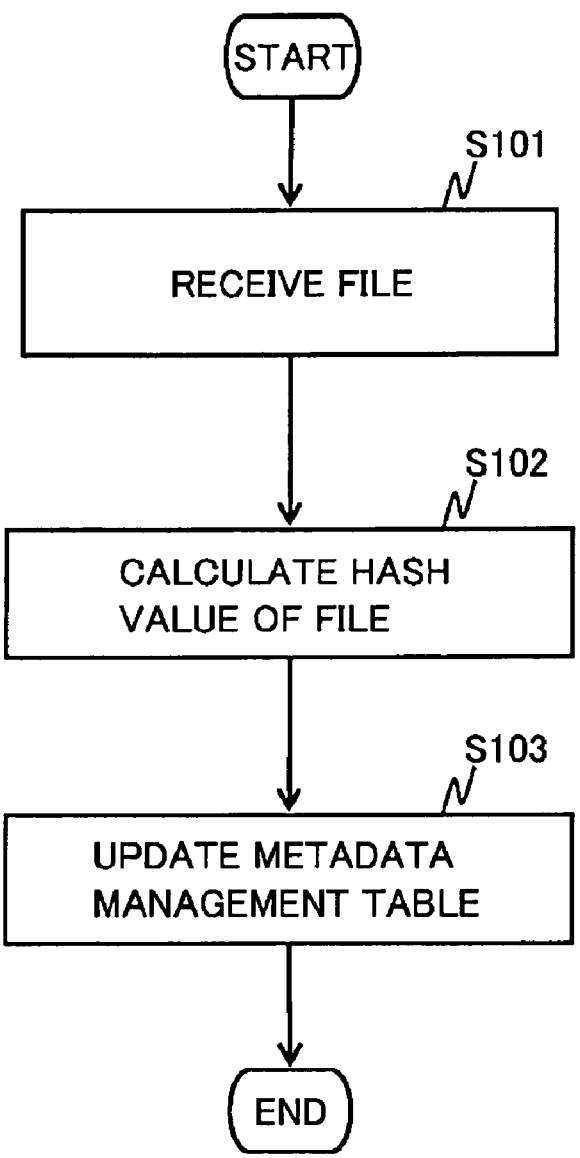

[Fig. 10]
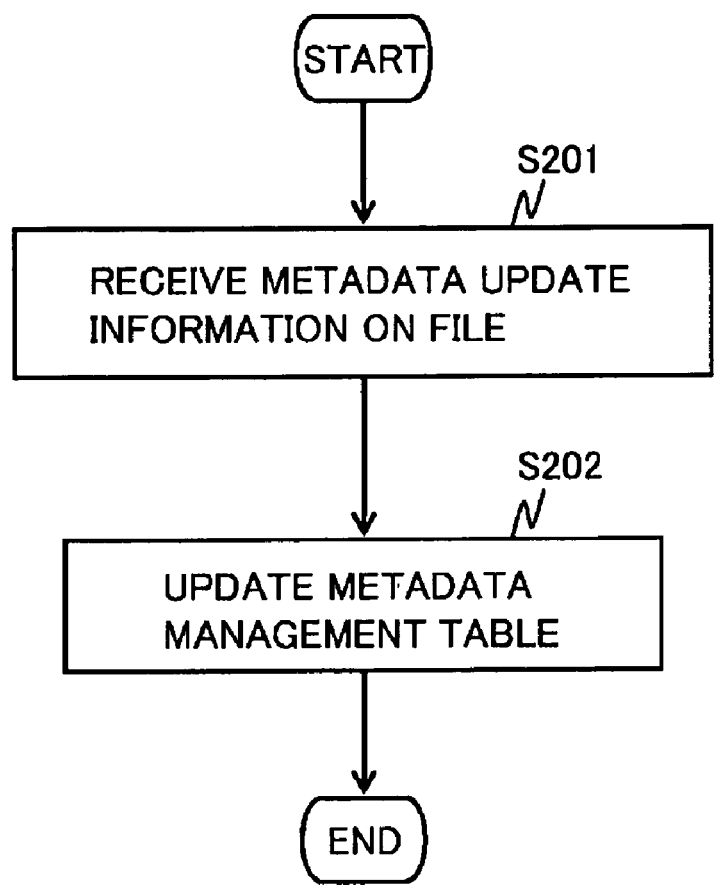

[Fig. 11]
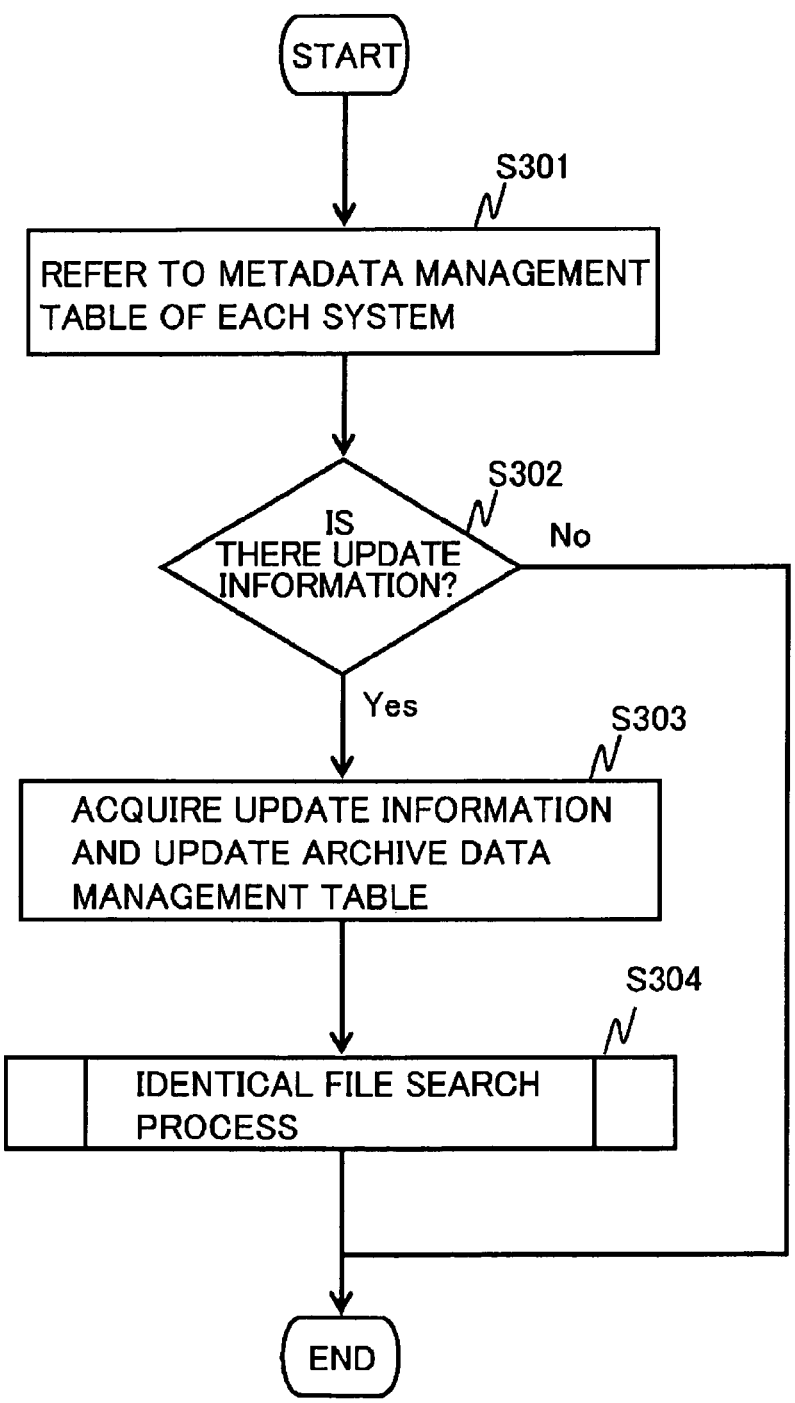

[Fig. 12]
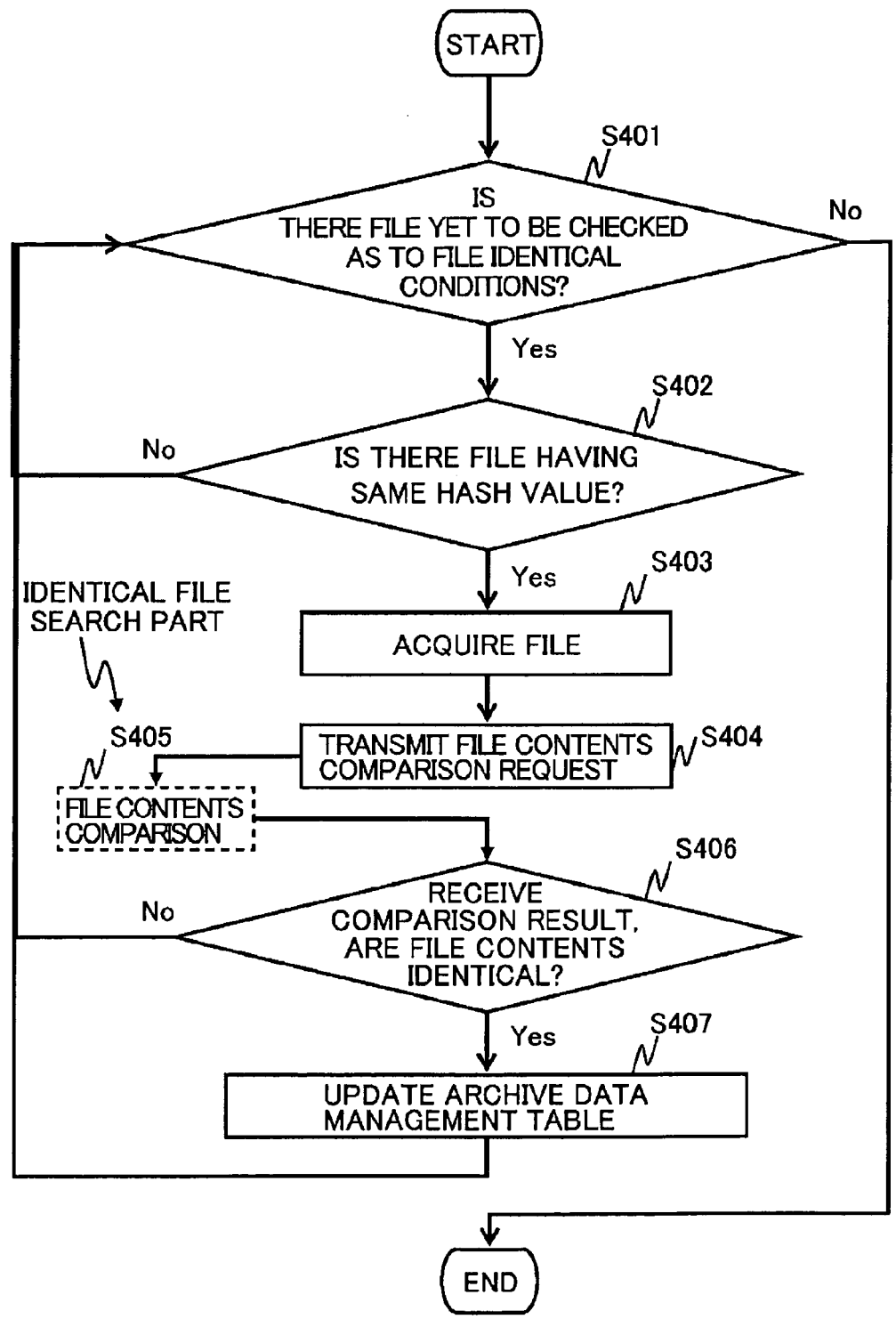

[Fig. 13]
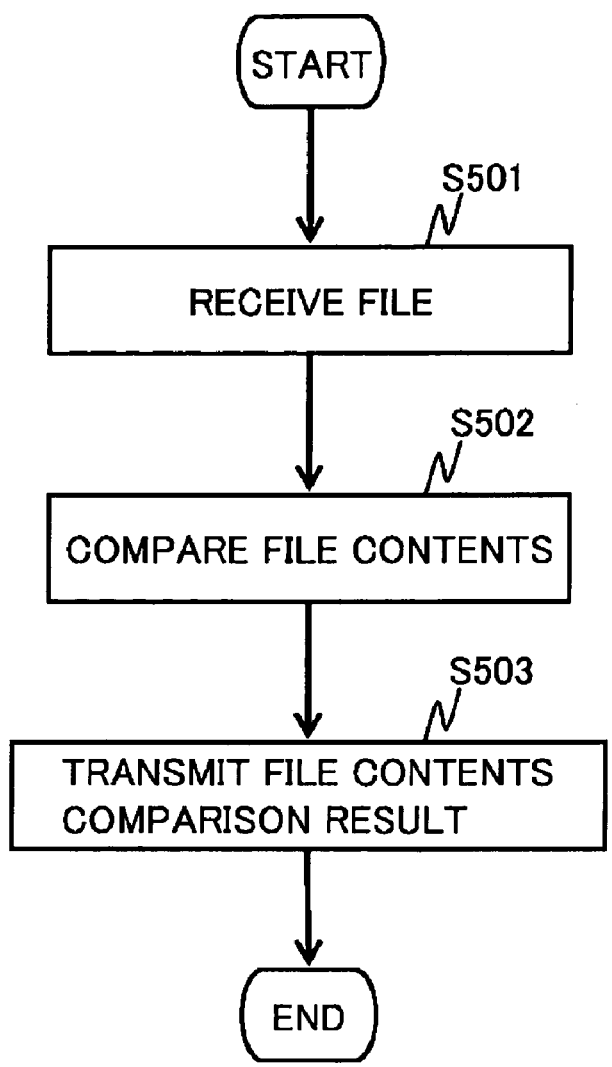

[Fig. 14A]
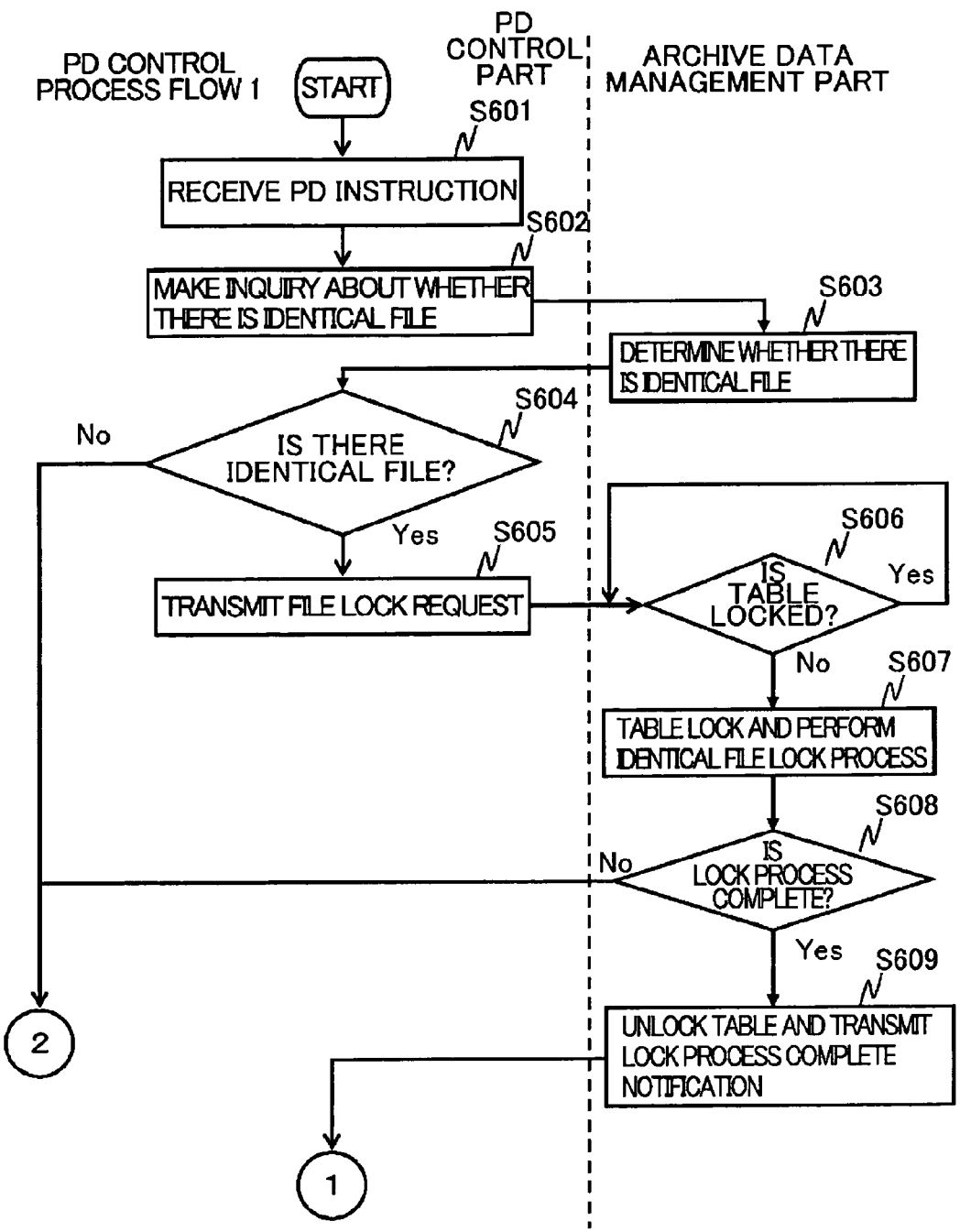

[Fig. 14B]
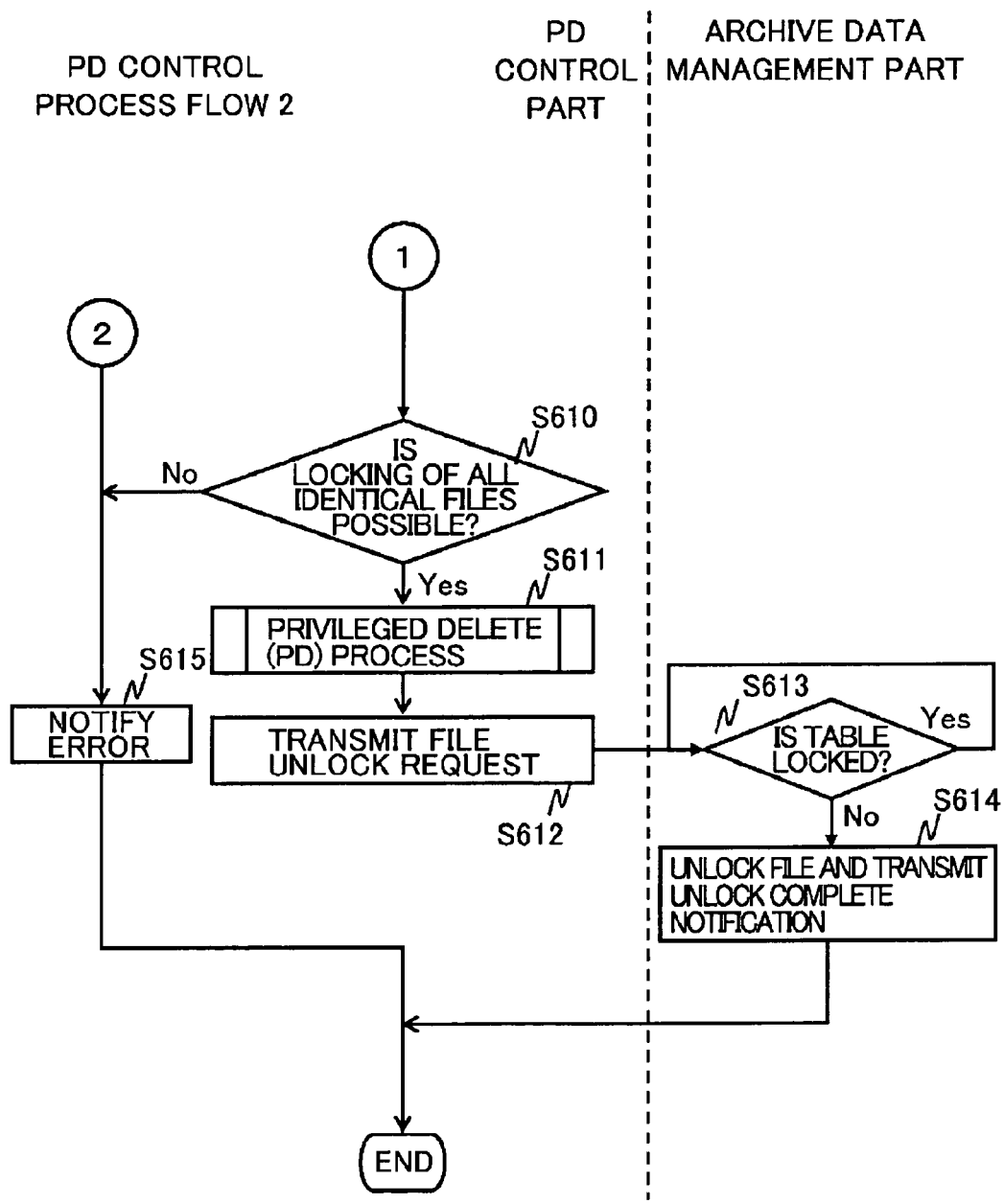

[Fig. 15]
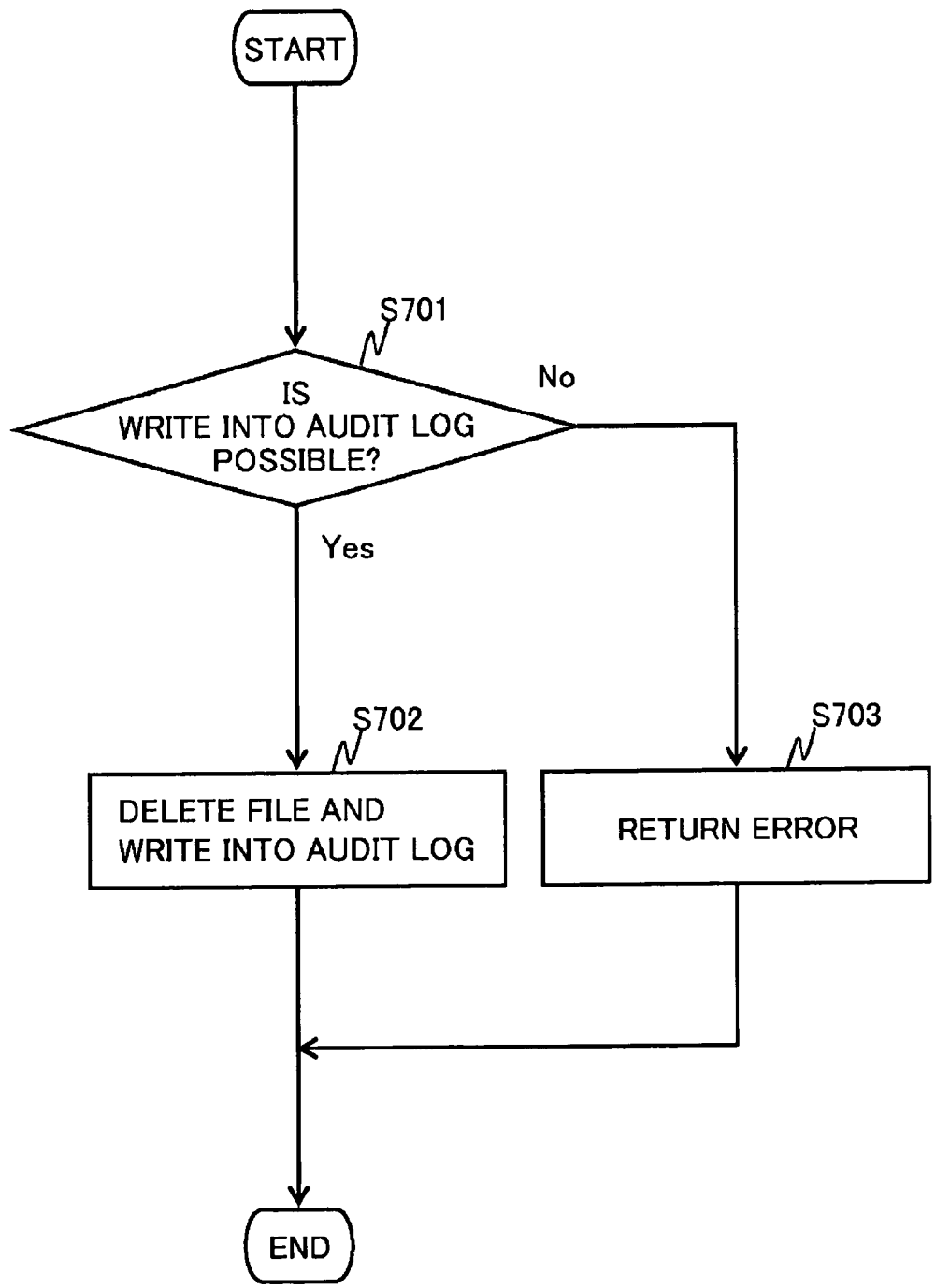

STORAGE SYSTEM AND DATA MANAGEMENT METHOD OF THE SAME

TECHNICAL FIELD

The present invention relates to a storage system and a data management method of the storage system, and more specifically, to a storage system and a data management method of the storage system, enabling secure storage of data required to be stored under given conditions while effectively utilizing a storage capacity.

BACKGROUND ART

An archive system that is one of the storage systems generally includes: a host computer on which applications to perform various operations run; and an archive apparatus coupled to the host computer and configured to read and write data in accordance with an instruction from the host computer.

The archive apparatus includes a computer (information processor) called an archive node and a storage apparatus configured to read and write data in accordance with an instruction from the archive node. The archive apparatus provides the host computer with a storage area as a data storing area for each application.

Upon receipt of an instruction to read and write data from the host computer, the archive node instructs the storage apparatus to read and write data associated with the instruction.

The storage apparatus manages a logical storage area provided by a physical disk while dividing the logical storage area into multiple unit logical storage areas. The storage apparatus provides the archive node with the unit logical storage areas as logical volumes. The logical volume is composed of multiple segments. Data reading and writing in accordance with an instruction from the host computer is enabled by allocating a storage area of a predetermined size on the physical disk to each of the segments.

As to such an archive system, Patent Document 1 discloses a distributed archive technique of allowing a host computer to access archive data even when a failure occurs in some of the multiple archive nodes. Specifically, in the distributed archive technique, the archive apparatus forms clusters by using the multiple archive nodes, and writes the archive data into two or more archive nodes according to redundancy specified by the host computer.

A predetermined retention period is set for each of the data (archive data) stored in the archive system. In the case of deleting the stored archive data, upon receipt of a data delete instruction from the host computer, the archive node executes the data delete process when detecting that the retention period set for the archive data has expired, and rejects the data delete instruction when detecting that the retention period for the delete target data has not yet expired.

The retention period of the data stored in such an archive system can usually be extended but cannot be shortened. However, Patent Document 2 discloses a technique of providing a configuration of allowing deletion of the archive data of which the retention period set has not yet expired or shortening of the data retention period only when a request is received from an authorized archive system manager. Such an archive data delete process based on a special authority given to the archive manager will be hereinafter referred to as a "privileged delete" (hereinafter abbreviated as "PD").

Upon receipt of a PD instruction from the archive system manager, the archive node executes the PD process according to the instruction and records a history of the PD process in an audit log stored in a memory.

CITATION LIST

Patent Literature

PTL 1: International Publication No. 2005/043323 pamphlet
PTL 2: U.S. Pat. No. 7,249,251 Specification

SUMMARY OF INVENTION

Technical Problem

However, conventional techniques cannot eliminate a risk of erroneously deleting and losing the archive data due to some kind of mistake by the archive system manager when the manager tries to execute the PD process, although the archive data should not be deleted in reality.

For example, here, consider the case where the conventional technique is applied to an archive data transfer process. This archive data transfer process is a process for moving archive data stored in one archive system to another archive system. In this process, transfer target archive data is copied to a transfer destination archive system, and then the transfer target data present in a transfer source archive system is deleted. In this event, when a retention period set for the transfer target archive data has not yet expired, the archive system manager executes the PD process to delete the archive data concerned.

In this event, there is a possibility that a one and only archive data is lost, the data being different from the transfer source archive data, when the archive system manager erroneously executes the PD process on an archive data that is not included in the transfer target archive data.

In consideration of the foregoing problem, an object of the present invention is to provide a storage system and a data management method of the storage system, which enable secure storage of data required to be stored under a given condition while effectively utilizing the storage capacity.

Solution to Problem

In order to achieve the foregoing and other objects, one aspect of the present invention is a storage system including a plurality of data storage systems each including a storage apparatus providing an external apparatus with a logical storage area as a data storage area, the logical storage area being generated from a physical storage medium, and an information processor, coupled to the external apparatus and the storage apparatus, controlling data which is input and output between the external apparatus and the storage apparatus, the storage system comprising a data attribute information retention part holding data delete allow/disallow information and data attribute information, the data delete allow/disallow information being information indicating whether or not the data is data allowed to be deleted, the data attribute information being information for distinctively identifying pieces of data stored in the storage apparatus of each of the data storage systems, a data management information retention part holding identical file presence/absence information and at least one of the data attribute information 2421 for each piece of data stored in the storage apparatus of each of the data storage systems, the identical file presence/absence information being information indicating whether there are a plurality of pieces of data identical for each piece of data, a data management part referring to the data attribute information retention part and managing the data management information retention part based on a result of the reference, and a data delete control part configured to control a process of deleting the data stored in the storage apparatuses based on a data delete command for the data, wherein the data management part checks the data management information retention part upon receipt of the data delete command, and records data protection information in the data management information retention part when detecting that the identical file presence information indicates that the storage apparatus of any of the data storage systems stores therein data being a target of the data delete command and another of the data having at least one of the data attribute information identical, the data protection information indicating that the another of the data is protected from the data delete command, and the data delete control part deletes the piece of data targeted by the data delete command.

Advantageous Effects of Invention

According to the present invention, a storage system and a data management method of the storage system, which enable secure storage of data required to be stored under a given condition while effectively utilizing a storage capacity is provided.

BRIEF DESCRIPTION OF DRAWINGS

FIG. 1 is a diagram showing a configuration example of a storage system according to an embodiment of the present invention.

FIG. 2 is a diagram showing a configuration example of a host computer according to an embodiment of the present invention.

FIG. 3 is a diagram showing a configuration example of a management computer according to an embodiment of the present invention.

FIG. 4 is a diagram showing a configuration example of an archive node according to an embodiment of the present invention.

FIG. 5 is a diagram showing a configuration example of a storage apparatus according to an embodiment of the present invention.

FIG. 6 is a diagram showing a configuration example of a metadata management table according to an embodiment of the present invention.

FIG. 7 is a diagram showing another configuration example of a metadata management table according to an embodiment of the present invention.

FIG. 8 is a diagram showing a configuration example of an archive data management table according to an embodiment of the present invention.

FIG. 9 is a flowchart showing an example of new file archiving process according to an embodiment of the present invention.

FIG. 10 is a flowchart showing an example of file metadata update process according to an embodiment of the present invention.

FIG. 11 is a flowchart showing an example of inter-archive system archive data information update process according to an embodiment of the present invention.

FIG. 12 is a flowchart showing an example of identical file search process according to an embodiment of the present invention.

FIG. 13 is a flowchart showing an example of file contents comparison process according to an embodiment of the present invention.

FIG. 14A is a flowchart showing an example of PD process according to an embodiment of the present invention.

FIG. 14B is a flowchart showing the example of the PD process following FIG. 14A according to an embodiment of the present invention.

FIG. 15 is a flowchart showing an example of PD process and audit log recording process according to an embodiment of the present invention.

DESCRIPTION OF EMBODIMENTS

With reference to the drawings, an embodiment of the present invention will be described below. Note that the present invention is not to be limited by the following description.

EXAMPLE 1

Outline of Storage System 1

FIG. 1 shows a configuration example of a storage system 1 according to an embodiment of the present invention. The storage system 1 is configured by coupling host computers (external apparatuses) 1000, a management computer 2000 and archive systems (data storage systems) 3000.

In order to facilitate understanding of the present invention, the storage system 1 in this embodiment includes two sets of archive systems 3000. However, three or more sets of archive systems 3000 may be provided. Moreover, the storage system 1 may include three or more host computers 1000.

The host computers 1000 and archive nodes 4000 in the archive systems 3000 are coupled to each other via a data I/O network 6000. In the present embodiment, as the data I/O network 6000, a LAN (Local Area Network) supporting communication according to an IP (Internet Protocol) is used.

The archive nodes 4000 in the archive systems 3000 are coupled to the management computer 2000 via a management network 7000. In the present embodiment, a LAN configured to support communication according to an IP is used as the management network 7000.

Archive System 3000

The archive system 3000 is configured to include the archive node (information processor) 4000 and a storage apparatus 5000. Each of the archive nodes 4000 are coupled to the storage apparatuses 5000, respectively, via an internal network 3500 that is a SAN (Storage Area Network) that is configured to support communication according to a Fibre Channel (hereinafter "FC"). The archive node 4000 is a computer configured to control input and output of archive data between the host computers 1000 and the storage apparatus 5000. A specific configuration of the archive node 4000 will be described later. Note that, in the configuration example shown in FIG. 1, there are two sets of identical archive systems 3000 provided, and when those archive systems need to be distinguished from each other they will be called the archive systems 1 and 2, respectively.

Note that, as described above, in the present embodiment, the internal network 3500 in the archive system 3000, the data I/O network 6000 and the management network 7000 may be configured by use of the same SAN.

Moreover, in the present embodiment, two or more archive nodes 4000 and storage apparatuses 5000 may be provided in each of the archive system 3000.

Host Computer 1000

FIG. 2 shows a configuration example of the host computer 1000. The host computer 1000 is typically configured to include a central processing unit 1100, a storage device 1200, an I/O device 1300, a memory 1400, a bus 1500 and a data I/O interface 1600.

The central processing unit 1100 is a processing unit, such as a CPU (Central Processing Unit) or a MPU (Micro Processing Unit). The storage device 1200 is a storage medium, such as a hard disk drive (hereinafter "HDD") or a semiconductor drive (Solid State Drive, "SSD").

The I/O device 1300 includes an input device (for example, a keyboard or a mouse) for receiving an operation input by a user and an output device (for example, a liquid crystal monitor). The data I/O interface 1600 is a communication interface coupled to the data I/O network 6000, and is a NIC (Network Interface Card) for coupling to the LAN in the present embodiment.

The memory 1400 is formed of a RAM (Random Access Memory) or a ROM (Read Only Memory). In the present embodiment, the memory 1400 stores an OS (Operating System) and an application program 1410 for creating and updating archive data to be stored in the archive node 4000. The bus 1500 is an internal communication path for coupling the central processing unit 1100, the storage device 1200, the I/O device 1300, the memory 1400 and the data I/O interface 1600 to each other.

Note that, in addition to the configuration shown in FIG. 2, the hardware configuration of the host computer 1000 can be achieved by a general-purpose electronic computer, a personal computer and the like having various configurations.

Management Computer 2000

FIG. 3 shows a configuration example of the management computer 2000. The management computer 2000 includes a central processing unit 2100, a storage device 2200, an I/O device 2300, a memory 2400, a bus 2500 and a management interface 2600. The central processing unit 2100, the storage device 2200, the I/O device 2300 and the bus 2500 are the same as those in the host computer 1000, and thus description thereof will be omitted.

The memory 2400 is formed of a RAM or a ROM as in the case of the memory 1400 in the host computer 1000, and stores an OS, an archive data management program 2410 and an archive data management table 2420 in this example. Description on the program and table stored in the memory 2400 will be given later. Note that a functional block achieved by the central processing unit 2100 executing the archive data management program 2410 will be hereinafter called an archive data management part 2410.

The management interface 2600 is a communication interface coupled to the management network 7000, and is an NIC (Network Interface Card) for coupling to the LAN in the present embodiment.

Note that, in addition to the configuration shown in FIG. 3, the hardware configuration of the management computer 2000 can be achieved by a general-purpose electronic computer, a personal computer and the like having various configurations. Moreover, the present invention can adopt other configurations such as a configuration having the management computer 2000 incorporated in any of the archive nodes 4000 to be described later, besides the configuration having the management computer 2000 independently provided as in the present embodiment.

Archive Node 4000

FIG. 4 shows a configuration example of the archive node 4000. The archive node 4000 is configured to include a central processing unit 4100, a storage device 4200, an I/O device 4300, a memory 4400, a bus 4500, a data I/O interface 4600, a storage interface 4700 and a management interface 4800. The central processing unit 4100, the storage device 4200, the I/O device 4300, the bus 4500, the data I/O interface 4600 and the management interface 4800 are the same as those in the host computer 1000 or the management computer 2000, and thus description thereof will be omitted.

The memory 4400 is formed of a RAM or a ROM as in the case of the memory 1400 in the host computer 1000, and stores a contents archiving process program 4410, a metadata management table 4420, an identical file search program 4430 and a PD control program 4440 in the present embodiment. Description on the programs and table stored in the memory 4400 will be given later. Note that functional blocks achieved by the central processing unit 4100 executing the contents archive process program 4410, the identical file search program 4430 and the PD control program 4440 will be hereinafter called a contents archiving process part 4410, an identical file search part 4430 and a PD control part 4440, respectively.

The storage interface 4700 is a communication interface coupled to the internal network 3500 and is an HBA (Host Bus Adapter) for coupling to the SAN in the present embodiment.

Note that, in addition to the configuration shown in FIG. 4, the hardware configuration of the archive node 4000 can be achieved by a general-purpose electronic computer, a personal computer and the like having various configurations.

Storage Apparatus 5000

FIG. 5 shows a configuration example of the storage apparatus 5000. The storage apparatus 5000 is configured to include a central processing unit 5100, a physical disk (physical storage medium) 5200, a shared memory 5300, a cache memory 5400 and a bus 5500. The central processing unit 5100, the bus 5500 and the storage interface 5600 are the same as those in the host computer 1000, the management computer 2000 or the archive node 4000, and thus description thereof will be omitted.

The storage apparatus 5000 uses one or more HDDs 5200 to store one or more logical volumes (logical storage areas) 5210 which are logical unit storage areas. The plurality of HDDs 5200 are combined so as to form a RAID (Redundant Arrays of Inexpensive Disks) group of an appropriate type and the RAID group can form the logical volume 5210. Moreover, a different type of storage medium such as a SSD can be used instead of the HDD 5200.

The shared memory 5300 is formed of a storage device such as a RAM and a ROM. The shared memory 5300 stores: a disk control program 5310 executed by the central processing unit 5100 to process an IO request (for example, a data write request, a data read request or the like) from the archive node 4000 to the logical volume 5210; and management tables to be used by the program 5310.

The cache memory 5400 is formed of a storage device such as a RAM, and is a memory for temporarily storing data read from the logical volume 5210 in response to the IO request from the archive node 4000 and data to be written into the logical volume 5210.

The storage interface 5600 is a communication interface coupled to the internal network 3500 and is a CHA (Channel Adapter) for coupling to the SAN in the present embodiment.

Description of Management Tables Used in the Present Embodiment

Next, description will be given of tables to be used in archive data management process according to the present embodiment.

Metadata Management Table 4420

FIGS. 6 and 7 show configuration examples of the metadata management table 4420. The metadata management table 4420 (data attribute information retention part) is a table in which metadata given to each file stored in the storage apparatuses 5000 in the archive systems 3000 are recorded so as to be associated with file names of the files. In the present embodiment, FIG. 6 shows an example of the metadata management table 4420 set for the archive system 1 (3000) shown in FIG. 1, and FIG. 7 shows an example of the metadata management table 4420 set for the archive system 2 (3000).

The metadata management table 4420 of the present embodiment has data attributes of each archive file, including, for example, a file name column 4421, a directory path name column 4422, a storage expiry date column (allow/disallow data deletion information) 4423 and a hash value column 4424.

In the file name column 4421, a file name given to each file is recorded together with an extension, for example. In the example of FIG. 6, a file name "A.jpg" is recorded in the first row. In the directory path name column 4422, a directory path name is recorded, the directory path name being a name for identifying a directory path in which a file having a corresponding file name is stored. The example of FIG. 6 shows that the file "A.jpg" is stored in a location indicated by "/data/dir1/".

In the storage expiry date column 4423, information indicating a storage expiry date of each file is recorded in order to distinguish a retention period of the file. The example of FIG. 6 shows that the file having the file name "A.jpg" has to be stored until "2015.12.31", that is, Dec. 31, 2015. In other words, deletion of the file prior to Dec. 31, 2015 is prohibited. As described above, when the file is to be deleted on or before the storage expiry date, an authorized manager performs deletion by a "privileged delete (PD)" process.

In the hash value column 4424, a hash value calculated for each file is stored. For calculation of the hash value, an appropriate hash function such as "SHA-1" or "MD5" may be used. The examples of FIGS. 6 and 7 show that the files indicated by the file names "A.jpg" and "B.doc", which are stored in the archive system 1, are identical to files indicated by the file names "A.jpg" and "B.doc", which are stored in the archive systems 2, respectively, since the file names and hash values thereof coincide with each other.

The metadata management table 4420 described above enables management of an update status of metadata given to each piece of archive data, and also enables determination on whether there are identical files as described later.

Archive Data Management Table 2420

FIG. 8 shows a configuration example of the archive data management table 2420. The archive data management table (data management information retention part) 2420 is a table in which pieces of management information on archive files stored in all the archive systems 3000 (in this example, the archive systems 1 and 2) are arranged in a list format for each file name given to each file.

The archive data management table 2420 includes a file name column 2421, an archive system name column (identical file presence information) 2422, a directory path name column 2423 and a lock column (data protection information) 2424.

In the file name column 2421, a file name given to each file is recorded together with, for example, an extension as in the case of the metadata management table 4420. In the archive system name column 2422, recorded are the names of archive systems (for example, the archive system 1) to which the storage apparatuses 5000 belong, the storage apparatuses 5000 storing each of the files of the plurality of files that are stored under an identical file name. When multiple archive system names are recorded for a single identical file name, this means that more than one identical file exists in the storage system 1. Note that, in order to carry out the objective of the present invention, the number of identical files present in the storage system 1 may be recorded.

In the directory path name column 2423, a directory path name is recorded, the directory path name being a name for identifying a directory path in which a file having a corresponding file name is stored, as in the case of the metadata management table 4420.

In the lock column 2424, a lock state of each file is recorded as "ON" or "OFF". When a lock state of a certain file is ON, this means that the file is locked, in other words, even if the file is specified to be subjected to a privileged delete process, such a specification is set to be rejected. This is performed by referring to the lock column 2424 of a target file when executing the PD process, for example, and by setting a process flow to suspend the delete process when "ON" is detected.

The archive data management table 2420 described above enables determination of whether or not two or more identical files are stored in the archive systems 3000.

Process Flows Implemented by Programs in the Present Embodiment

Next, with reference to FIGS. 9 to 15, description will be given of archive data management process flows according to the present embodiment. Note that, as an execution condition for such management processes, it is assumed that the metadata management table 4420 is set in the memory 4400 of each archive node 4000 and the archive data management table 2420 is set in the memory 2400 of the management computer 2000. Moreover, in each of the process flows shown in the drawings, reference symbol "S" represents step.

New File Archiving Process

FIG. 9 is a flowchart showing an example of a procedure of new file archiving process according to the present embodiment. The new file archiving process is performed by executing the contents archiving process program 4410 stored in the memory 4400 of the archive node 4000. The new file archiving process is a process executed for newly storing file data received from the host computer 1000 as archive data in the archive system 3000.

First, the contents archiving process part 4410 receives an archive target file from the application program 1410 run in the host computer 1000, and transmits the received file to the storage apparatus 5000 (S101).

Next, the contents archiving process part 4410 uses an appropriate hash function such as "SHA-1" or "MD5" to calculate a hash value of the file received in S101 (S102).

Thereafter, the contents archiving process part 4410 registers, in the metadata management table 4420, information (in the examples of FIGS. 6 and 7, information including a file name, a directory path name, a storage expiry date and a hash value) on the file acquired in S101 and S102 (S103), and then terminates the process.

The above configuration allows the newly added archive data to be a target of the archive data management according to the present embodiment.

Metadata Update Process

FIG. 10 is a flowchart showing a procedure of metadata update process. The metadata update process is performed by executing the contents archiving process program 4410 stored in the memory 4400 in the archive node 4000. In the case where information stored in the metadata management table 4420 is updated, the metadata update process is executed for reflecting the updated contents of the update on the metadata management table 4420.

First, the contents archive process part 4410 receives information (metadata update information) indicating updated metadata contents such as a retention period extension from the application program 1410 running in the host computer 1000 (S201).

Next, the contents archiving process part 4410 registers, in the metadata management table 4420, the updated metadata contents (a change in the retention period and the like) included in the metadata update information acquired in S201 (S202), and then terminates the process.

The above configuration allows the metadata of each piece of archive data to be updated at the right time. Thus, an identical file determination process to be described later can be properly executed.

Inter-Archive System Archive Data Information Update Process Procedure

FIG. 11 is a flowchart showing an example of an inter-archive system archive data information update process procedure. The inter-archive system archive data information update process is performed by executing the archive data management program 2410 stored in the memory 2400 of the management computer 2000. The inter-archive system archive data information update process is for determining whether or not there is a file required to be protected from PD by referring to and comparing the contents of the metadata management table 4420 in each archive system 3000. This process flow is executed at predetermined time intervals to reflect a metadata update status in each archive system 3000 on the archive data management table 2420 at an appropriate time.

First, the archive data management part 2410 collects update information on the metadata management table 4420 from the archive node 4000 in each archive system 3000 (S301).

Next, the archive data management part 2410 determines whether or not the information recorded in the each metadata management table 4420 has been updated, by determining whether or not there is a change from the previously collected metadata (S302), for example. When it is determined that the information has been updated (S302, Yes), update information is acquired from the metadata management table 4420, and the acquired update information is registered in a corresponding item in the archive data management table 2420 (S303). When no information has been updated, in other words, the result of the determination in S302 is No, the process is terminated as it is.

Thereafter, the archive data management part 2410 executes an identical file search process (S304) and then terminates the process. Description on identical file search process will be given later.

The above configuration makes it possible to appropriately record an identical file that has come to exist in the archive data management table 2420 when the metadata has been updated.

Identical File Search Process

FIG. 12 is a flowchart showing an example of the identical file search process that is S303 in FIG. 11.

First, the archive data management part 2410 in the management computer 2000 determines whether or not there is a file having a file identical condition yet to be checked among files newly registered in the archive data management table 2420 (S401). When it is determined that there is a file having a file identical condition yet to be checked (S401, Yes), the process moves to S402. On the other hand, when it is determined that there is no such file (S401, No), the process is terminated.

In the present embodiment, a condition for determining that two or more files are identical (file identical condition) is "hash values of respective files and contents of the files are to coincide with each other." Note that the file identical condition is not limited to that of the present embodiment. For example, the file identical condition may also include "file retention periods are to coincide with each other" in addition to the condition of the present embodiment.

Next, the archive data management part 2410 determines by comparing whether or not a hash value of a file newly registered in the archive data management table 2420 and a hash value of the file already registered in the archive data management table 2420 coincide with each other (S402). When it is determined that the hash values coincide with each other (S402, Yes), the process moves to S403. On the other hand, when it is determined that the hash values do not coincide with each other (S402, No), the process returns to S401.

Thereafter, the archive data management part 2410 acquires the files determined to have identical hash value in S402 from the archive node 4000.

Subsequently, the archive data management part 2410 transmits information on the files determined to have the identical hash value in S402, the files acquired in S403 and a request to compare contents of the files to the identical file search part 4430 in the archive node 4000 in which the files having the identical hash value exist (S404).

Upon receipt of the file contents comparison request, the identical file search part 4430 compares the file contents according to the received contents (S405), and transmits a result of the comparison to the archive data management part 2410. The reason for comparing the file contents as described above is to prevent files that are actually different from being erroneously determined as identical files when the hash values calculated for the respective files clash.

The archive data management part 2410 receives a result of the file contents comparison from the identical file search part 4430 in the archive node 4000 and determines the result (S406). When the archive data management part 2410 receives a result indicating that the file contents are determined to coincide with each other (S406, Yes) at the identical file search part 4430, the process proceeds to S407. On the other hand, when the archive data management part 2410 receives a result indicating that the file contents are determined not to coincide with each other (S406, No), the process returns to S401.

When the file contents coincide with each other, the archive data management part 2410 updates the archive data management table 2420 based on the information received from the identical file search part 4430 in S405, and then returns to S401.

The above configuration allows the presence or absence of the identical file within all the archive systems 3000 to be properly recorded in the archive data management table 2420 even if the metadata has been updated in each archive node 4000.

Process Executed by Identical File Search Part 4430

FIG. 13 is a flowchart showing an example of a process executed by the identical file search part 4430 in the archive node 4000.

First, the identical file search part 4430 receives the files determined to have the identical hash value and the request to compare the contents of the files from the archive data management part 2410 in the management computer 2000. "Compare file contents" is a process of determining whether or not the files to be compared have completely identical data.

Next, the identical file search part 4430 compares contents of a file transmitted from the archive data management part 2410 with contents of a file having a hash value identical to that of the transmitted file (S502).

Thereafter, the identical file search part 4430 transmits, to the archive data management part 2410, the result of S502, that is, information including a result of determination of whether or not the file contents coincide with each other (S503), and then terminates the process.

The above configuration allows appropriate determination on the identity of the files.

Privileged Delete (PD) Process

FIGS. 14A and 14B are flowcharts showing an example of a PD process executed by the PD control part 4440 in the archive node 4000. As described above, the PD process is a process for safely deleting a file of which retention period in metadata has not yet expired.

First, the PD control part 4440 receives a PD instruction for a specific file from the management computer 2000 based on an input by an archive system manager (S601).

Next, the PD control part 4440 makes an inquiry with the archive data management part 2410 in the management computer 2000 about whether or not the file identical to the PD target file exists in any of the archive systems 3000 (S602).

The archive data management part 2410 refers to the archive data management table 2420 to check if there is the file identical to the PD target file. The archive data management part 2410 determines whether or not there is the file identical to the PD target file, and sends identical file presence information including a result of the determination back to the PD control part 4440 (S603).

Thereafter, the PD control part 4440 refers to the information on whether or not a file identical to the PD target file exits, the information received from the archive data management part 2410, to determine whether or not there is an identical file (S604). When it is determined that there is a file identical to the PD target file (S604, Yes), the PD control part 4440 requests the archive data management part 2410 in the management computer 2000 to perform a lock process for the file identical to the PD target file (S605). On the other hand, when it is determined that there is no identical file (S604, No), the PD control part 4440 displays an error message indicating that the PD has failed, and then terminates the process (S615 in FIG. 14B).

Upon receipt of the identical file lock process request from the PD control part 4440, the archive data management part 2410 determines whether or not the archive data management table 2420 is accessible, that is, determines whether or not the archive data management table 2420 is locked by another process (S606). When it is determined that the archive data management table 2420 is locked (S606, Yes), the archive data management part 2410 waits until the lock is released.

On the other hand, when it is determined that the archive data management table 2420 is not locked (S606, No), the archive data management part 2410 locks the archive data management table 2420 for the archive data management part 2410 itself to occupy the archive data management table 2420.

After locking the archive data management table 2420, the archive data management part 2410 changes the lock column 2424 for the PD target file and the lock columns 2424 for all the files determined to be the identical to the PD target file in the archive data management table 2420 from "OFF" to "ON" (S607 and S608, Yes). Thereafter, the archive data management part 2410 unlocks the table and transmits a notification notifying completion of the file lock process to the PD control part 4440 (S609).

Note that, when the archive data management table 2420 is being locked as described above, the archive data management part 2410 may be configured to transmit to the PD control part 4440 a notification notifying the fact that the file lock process cannot be executed, without waiting for the table to be unlocked.

Moreover, when the lock column 2424 for the PD target file or the lock column 2424 for the identical file is set "ON", the archive data management part 2410 unlocks the archive data management table 2420, and transmits, to the PD control part 4440, the fact that the file lock process cannot be executed (S608, No).

Next, the PD control part 4440 determines whether or not file lock is enabled based on file lock enabled/disabled information received from the archive data management part 2410 (S610). When it is determined that the file lock is enabled (S610, Yes), the process proceeds to S611. On the other hand, when it is determined that the file lock is disabled (S610, No), the PD control part 4440 displays an error message indicating that the PD has failed, and then terminates the process (S615).

When it is determined in S608 that the file lock is enabled, the PD control part 4440 executes PD of the file (S611).

Thereafter, the PD control part 4440 requests the archive data management part 2410 to perform unlock process of the file identical to the PD target file (S612).

Upon receipt of the unlock process request, the archive data management part 2410 determines whether or not the archive data management table 2420 is accessible, that is, whether or not the archive data management table 2420 is locked by another process (S613). When it is determined that the archive data management table 2420 is locked (S613, Yes), the archive data management part 2410 waits until the lock is released.

On the other hand, when it is determined that the archive data management table 2420 is not locked (S613, No), the archive data management part 2410 locks the archive data management table 2420 for the archive data management part 2410 itself to occupy the archive data management table 2420.

After locking the archive data management table 2420, the archive data management part 2410 changes the lock columns 2424 for all the identical files in the archive data management table 2420 from "ON" to "OFF". Thereafter, the archive data management part 2410 unlocks the archive data management table 2420, and transmits a notification notifying completion of the file unlock process to the PD control part 4440 (S614). In this way, the PD control process flow is completed.

Note that the following configuration can also be adopted. Specifically, when an inquiry about the number of existing files is made with the archive data management part 2410 after completion of the PD process and the number of the identical files is determined to be 2 as a result, the identical files are set in a lock state without performing a file unlock process and the PD process is not allowed to be performed for any of the files. This configuration allows any one of the files to be handled as a backup file. Thus, safety for storage of archive files is further enhanced.

In the present embodiment, since archive systems 1 and 2 are provided in the storage system 1, when it is determined that there are two identical files (for example, "A.jpg" in FIGS. 6 and 7) in the storage system 1, the PD process for those files is prohibited. This shows a state where copying of "A.jpg" from the archive system 1 to the archive system 2 is completed, in the case of moving "A.jpg" in the archive system 1 to the archive system 2, for example.

Meanwhile, as described above, considering the case where there are three or more archive systems 3000 and it is determined that there are three or more identical files, even if a file identical to the PD target file is erroneously deleted together with the correct PD target file, all the archive files will not be deleted. In other words, when there are three or more identical files, at least one of the files remains even if an incorrect PD process is executed. Therefore, when there are three or more archive systems 3000, a criterion for determining whether or not there is an identical file in S604 may be set to "there are identical files and the number of the same files is 2 or less." Thus, it can be set to lock the PD process when there are two identical files.

The above configuration prevents deletion of all of the archive files of which retention period indicated by the metadata has not yet expired.

Moreover, when there are three or more identical files, a configuration of allowing the PD process to continue until the number of the identical files remaining reaches 2 is adopted. This configuration allows effective utilization of capacity resources of the archive systems 3000 while avoiding a risk of losing the archive data before expiry of the retention period.

PD Process

FIG. 15 is a flowchart showing an example of the PD process (S606) shown in FIG. 14. In the PD process, file deletion is executed by the PD, and a history of executions is recorded in an audit log set in the memory 4400 of the archive node 4000, for example.

First, the PD control part 4440 checks if writing into an audit log that is writing a history of PDs can be performed (S701). When it is determined that the history can be written into the audit log (S701, Yes), the PD control part 4440 moves the process to S702. On the other hand, when it is determined that the history cannot be written into the audit log (S701, No), the PD control part 4440 displays an error message indicating that the PD has failed, and then terminates the process (S703).

In S702, the PD control part 4440 executes the PD of the file, writes a history of the PD into the audit log, and then terminates the process.

The above configuration allows deletion of the archive files during the retention period, and also allows the deletion process to be recorded in the audit log.

As described in detail above, the present embodiment provides a storage system and a data management method of the storage system, which enable secure storage of archive data having a predetermined retention period while effectively utilizing a storage capacity.

Although the invention of the present application has been described above along with an embodiment with reference to the accompanying drawings, the invention of the present application is not limited to the embodiment described above. Moreover, all modifications and equivalents falling within the spirit of the invention are within the scope of the invention.

The invention claimed is:

1. A storage system including
a plurality of data storage systems, each including
a storage apparatus configured to provide an external apparatus with a logical storage area as a data storage area, the logical storage area being generated from a physical storage medium, and
an information processor, coupled to the external apparatus and the storage apparatus, configured to control input and output of data between the external apparatus and the storage apparatus,
the information processor comprising:
a data attribute information retention part configured to hold data delete allow/disallow information and data attribute information, the data delete allow/disallow information being information indicating whether or not each piece of data stored in the storage apparatus is a piece of data allowed to be deleted, the data attribute information being information for distinctively identifying pieces of data stored in the storage apparatus; and
a data delete control part configured to
refer to the data attribute information retention part upon receipt of a data delete command for any piece of data stored in the storage apparatus,
when the data delete allow/disallow information indicates that the piece of data targeted by the data delete command is a piece of data allowed to be deleted, delete the piece of data targeted by the data delete command according to the data delete command, and
when the data delete allow/disallow information indicates that the piece of data targeted by the data delete command is a piece of data disallowed to be deleted, refuse deletion of the piece of data targeted by the data delete command,
the storage system comprising:
a data management information retention part configured to hold identical file presence/absence information and at least one of the data attribute information for each piece of data stored in each of the storage apparatuses of the plurality of data storage systems, the identical file presence/absence information being information indicating whether there are a plurality of pieces of data identical for each piece of data; and
a data management part configured to refer to the data attribute information retention part and to manage the data management information retention part based on a result of the reference, and
wherein, upon receipt of a privileged delete command different from the data delete command allowing deletion of a piece of data targeted by the data delete command even when the data delete allow/disallow information indicates the piece of data targeted by the data delete command is a piece of data disallowed to be deleted, the data delete control part is configured to inquire the data management part whether or not a piece of data exists in any of the storage apparatuses of the plurality of the data storage systems that is identical to the piece of data targeted by the privileged delete command,
wherein the data management part is configured to
check the data management information retention part,
determine whether or not identical file presence/absence information being information indicating whether or not a piece of data exists in any of the storage apparatuses of the plurality of the data storage systems that is identical to the piece of data targeted by the privileged delete command indicates presence of one or more pieces of data having at least one piece of the data attribute information identical to that of the data targeted by the privileged delete command, and send a result of the determination to the data delete control part, wherein, when the result of the determination indicates presence of one or more pieces of data having at least one piece of the data attribute information identical to that of the data targeted by the privileged delete command in any of the storage apparatuses of the plurality of the data storage systems, the data delete control part is configured to request the data management part to inhibit deletion according to a different privileged delete command of the one or more different pieces of data; and wherein the data management part is configured to record data protection information indicating that deletion of the different one or more pieces of data according to the different privileged delete command is inhibited in the data management information retention part, the data delete control part is configured to delete the piece of data targeted by the privileged delete command in the storage apparatus even when the data delete allow/disallow information indicates the piece of data targeted by the privileged delete command is disallowed to be deleted, and the data delete control part is configured to refuse to delete the data targeted by the privileged delete command when the data delete control part detects absence of one or more pieces of data having at least one piece of the data attribute information identical to that of the data targeted by the privileged delete command in any of the storage apparatuses of the plurality of the data storage system.

2. The storage system according to claim 1, wherein each piece of the data stored in the storage apparatus of each of the plurality of data storage systems is an archive file having a retention period set, and being stored in the storage apparatus of each of the plurality of data storage systems from a host apparatus serving as the external apparatus, the data attribute information retention part being a metadata management table holding as the data attribute information, a file name of each archive file and a hash value calculated for each archive file, the archive files being stored in the storage apparatus coupled to the information processor to which the data attribute information retention part belongs, the data management information retention part being an archive data management table in which, for each archive file stored in the storage apparatus of each of the plurality of data storage systems, the file name and an archive system name as the identical file presence/absence information are held in association with each other, the data management part is configured to check the archive data management table upon receipt of the inquiry from the data delete control part and, determine, based on the file name and the archive system name, whether or not any one of the storage apparatuses has stored therein one or more different archive files having the identical file name to the archive file targeted by the privileged delete command, the data management part is configured to set lock information to the one or more different archive files, the lock information indicating that the different archive file is protected from deletion according to a different privileged delete command to the archive data management table, and the data delete control part is configured to delete the archive file targeted by the privileged delete command.

3. The storage system according to claim 1, wherein the data delete allow/disallow information is information indicating a retention period of each piece of data stored in the storage apparatus.

4. The storage system according to claim 1, wherein the data delete control part is configured not to send the request to the data management part when the data delete control part detects that the result of the determination indicates that the storage apparatus of any of the data storage systems stores therein two or more other pieces of data having at least one of the data attribute information identical to that of a piece of data targeted by the privileged delete command.

5. The storage system according to claim 1, wherein each of the information processors of the plurality of data storage system further comprises:

an identical file search part configured to determine whether respective pieces of data stored in the storage apparatuses are identical to each other, wherein the data management part refers to the data attribute information retention part in each of the plurality of data storage systems to acquire the data attribute information recorded in the data attribute information retention part, when determining that the data attribute information indicates that the plurality of data storage systems store therein one or more pieces of data having identical ones of the data attribute information, transmit a command to the identical file search part of the information processor stored in the storage apparatus storing the one or more pieces of the data to compare contents of the pieces of data having the identical ones of the data attribute information, and upon receipt of a determination result from the identical file search part, the result indicating that the one or more pieces of data having the identical ones of the data attribute information are identical, record the data attribute information and the identical file presence/absence information on the one or more pieces of data into the data management information retention part.

6. The storage system according to claim 1, wherein the data attribute information includes a data name that is a code for identifying each piece of the data and a hash value calculated for each piece of the data.

7. The storage system according to claim 1, further comprising:

a management computer coupled to each of the information processors of the plurality of data storage systems, wherein the management computer is enabled to transmit to the data delete control part of each of the information processors of the plurality of data storage systems the data delete command.

8. The storage system according to claim 1, wherein
the data management part is configured to execute a process for protecting the data management information retention part from an access by the different data storage system when recording the data protection information in the data management information retention part.

9. A data management method of a storage system including a plurality of data storage systems, each including
a storage apparatus configured to provide an external apparatus with a logical storage area as a data storage area, the logical storage area being generated from a physical storage medium, and
an information processor, coupled to the external apparatus and the storage apparatus, configured to control input and output of data between the external apparatus and the storage apparatus,
a data attribute information retention part configured to hold data delete allow/disallow information and data attribute information, the data delete allow/disallow information being information indicating whether or not each piece of data stored in the storage apparatus is a piece of data allowed to be deleted, the data attribute information being information for distinctively identifying pieces of data stored in the storage apparatus, and
a data delete control part configured to
refer to the data attribute information retention part upon receipt of a data delete command for any piece of data stored in the storage apparatus,
when the data delete allow/disallow information indicates that the piece of data targeted by the data delete command is a piece of data allowed to be deleted, delete the piece of data targeted by the data delete command according to the data delete command, and,
when the data delete allow/disallow information indicates that the piece of data targeted by the data delete command is a piece of data disallowed to be deleted, refuse deletion of the piece of data targeted by the data delete command,
the storage system further including:
a data management information retention part configured to hold identical file presence/absence information and at least one of the data attribute information for each piece of data stored in each of the storage apparatuses of the plurality of data storage systems, the identical file presence/absence information being information indicating whether there are a plurality of pieces of data identical for each piece of data; and
a data management part configured to refer to the data attribute information retention part and to manage the data management information retention part based on a result of the reference,
the method comprising:
upon receipt of a privileged delete command different from a data delete command allowing deletion of a piece of data targeted by the data delete command even when the data delete allow/disallow information indicates the piece of data targeted by the data delete command is a piece of data disallowed to be deleted, via the data delete control part, inquiring the data management part whether or not a piece of data exists in any of the storage apparatuses of the plurality of the data storage system that is identical to the piece of data targeted by the privileged delete command,
via the data management part, checking the data management information retention part, determining whether or not identical file presence/absence information being information indicating whether or not a piece of data exists in any of the storage apparatuses of the plurality of the data storage systems that is identical to the piece of data targeted by the privileged delete command indicates presence of one or more pieces of data having at least one piece of the data attribute information identical to that of the data targeted by the privileged delete command, and sending a result of the determination to the data delete control part,
when the result of the determination indicates presence of one or more pieces of data having at least one piece of the data attribute information identical to that of the data targeted by the privileged delete command in any of the storage apparatuses of the plurality of the data storage system, via the data delete control part, requesting the data management part to inhibit deletion according to another privileged delete command of the one or more different pieces of data,
via the data management part, recording data protection information indicating that deletion of the different one or more pieces of data according to the different privileged delete command is inhibited in the data management information retention part,
via the data delete control part, deleting the piece of data targeted by the privileged delete command in the storage apparatus even when the data delete allow/disallow information indicates the piece of data targeted by the privileged delete command is disallowed to be deleted, and
via the data delete control part, refusing to delete the data targeted by the privileged delete command when the data delete control part detects absence of one or more pieces of data having at least one piece of the data attribute information identical to that of the data targeted by the privileged delete command in any of the storage apparatuses of the plurality of the data storage system.

10. The data management method according to claim 9, wherein
the data delete allow/disallow information is information indicating a retention period of each piece of data stored in the storage apparatus.

11. The data management method according to claim 9, wherein
the data delete control part does not is configured not to send the request to the data management part when the data delete control part detects that the result of the determination indicates that the storage apparatus of any of the data storage systems stores therein two or more other pieces of data having at least one of the data attribute information identical to that of a piece of data targeted by the privileged delete command.

12. The data management method according to claim 9, wherein each of the information processors of the plurality of data storage systems further comprises:
an identical file search part configured to determine whether respective pieces of data stored in the storage apparatuses are identical to each other,
wherein the data management part configured to
refer to the data attribute information retention part in each of the plurality of data storage systems to acquire the data attribute information recorded in the data attribute information retention part, and
when determining that the data attribute information indicates that the plurality of data storage systems store therein one or more pieces of data having identical ones of the data attribute information, transmit a command to the identical file search part of the information processor stored in the storage apparatus storing the one or more pieces of the data to compare contents of the pieces of data having the identical ones of the data attribute information, and upon receipt of a determination result from the identical file search part, the result indicating that the one or more pieces of data having the identical ones of the data attribute information are identical, record the data attribute information and the identical file presence/absence information on the one or more pieces of data into the data management information retention part.

13. The data management method according to claim 9, wherein the data attribute information includes a data name that is a code for identifying each piece of the data and a hash value calculated for each piece of the data.

14. The data management method according to claim 9, wherein the storage system further includes a management computer coupled to each of the information processors of the plurality of data storage systems, wherein the management computer is enabled to transmit to the data delete control part of each of the information processors of the plurality of data storage systems the data delete command.

15. The data management method according to claim 9, wherein the data management part is configured to execute a process for protecting the data management information retention part from an access by the different data storage system when recording the data protection information in the data management information retention part.

* * * * *